Nov. 30, 1954      A. N. GRAY      2,695,422

APPARATUS FOR ADVANCING AND WORKING ELASTOMER COMPOUNDS

Filed Dec. 12, 1951      3 Sheets-Sheet 1

INVENTOR
A. N. GRAY
BY
ATTORNEY

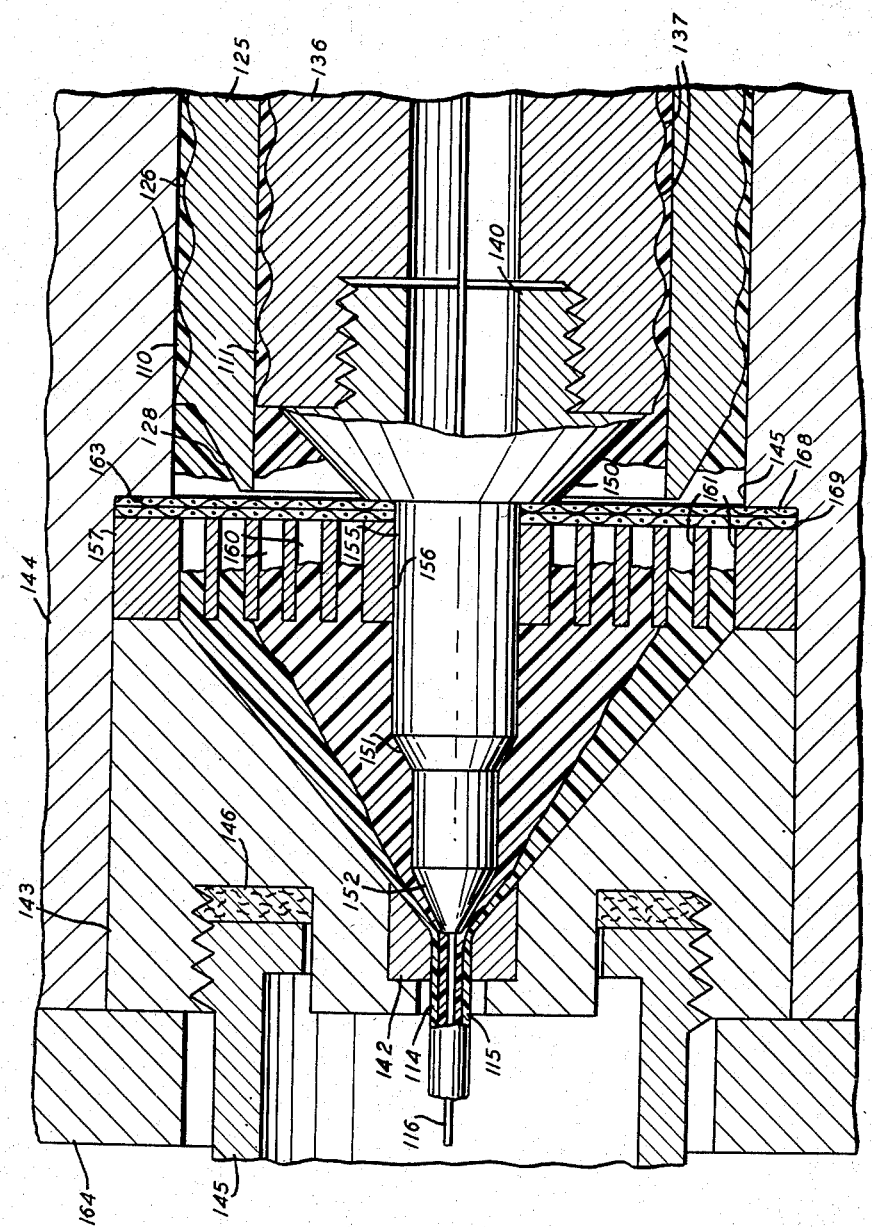

United States Patent Office 2,695,422
Patented Nov. 30, 1954

2,695,422

APPARATUS FOR ADVANCING AND WORKING ELASTOMER COMPOUNDS

Alvin N. Gray, Edgewood, Md., assignor to Western Electric Company, Incorporated, New York, N. Y., a corporation of New York Application December 12, 1951, Serial No. 261,275

7 Claims. (Cl. 18—13)

This invention relates to apparatus for advancing and working elastomer compounds, and more particularly to apparatus for simultaneously extruding concentric insulating and jacketing coverings on conductors.

In the manufacture of conductors having several layers of insulation enclosing the conductor cores, it has been customary in the past to extrude a vulcanizable covering on a conductor core, vulcanize the covering, wind the product on a reel, unwind the product from the reel, extrude a second vulcanizable covering over the first covering and then vulcanize that covering. Obviously, such a procedure involves considerable equipment and much handling of the intermediate product, and no satisfactory apparatus for extruding both coverings on the conductor core simultaneously has been found.

An object of the invention is to provide new and improved apparatus for advancing and working elastomer compounds.

A further object of the invention is to provide new and improved apparatus for simultaneously extruding insulating and jacketing coverings on conductors.

Another object of the invention is to provide new and improved apparatus for simultaneously working and extruding two different plastic compounds in concentric layers on the conductor core, and for simultaneously vulcanizing the coverings.

In an apparatus illustrating certain features of the invention, a conductor core is advanced through an extruder which simultaneously forces two plastic compounds into concentric coverings on the core, and, if the plastic compounds include vulcanizable material, the coverings then may be vulcanized.

A complete understanding of the invention may be obtained from the following detailed description of apparatus forming specific embodiments thereof, when read in conjunction with the appended drawings, in which Fig. 1 is a fragmentary, side elevation of an apparatus embodying the invention;

Fig. 5 is an enlarged, fragmentary, vertical section of an apparatus forming an alternative embodiment of the invention.

Figure 2:
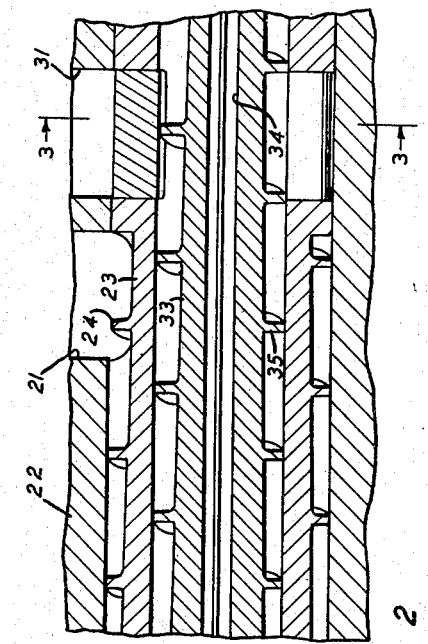
Fig. 2 is an enlarged, vertical section of a portion of the apparatus shown in Fig. 1.
Figure 3:
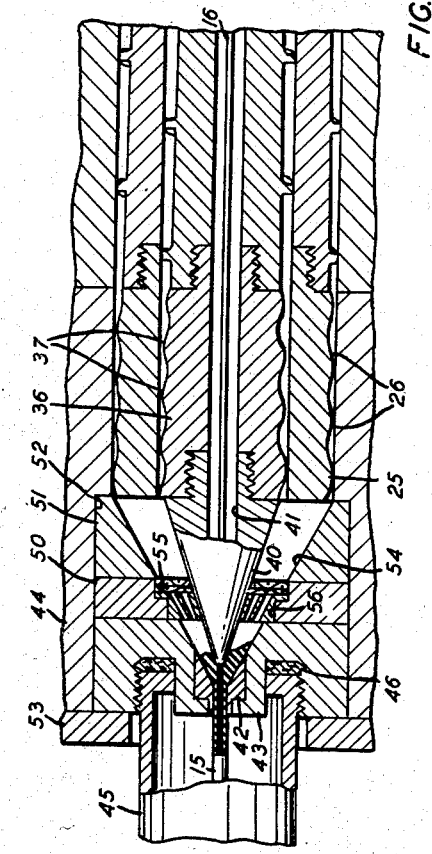
Fig. 3 is a vertical section taken along line 3—3 of Fig. 2.
Figure 3:
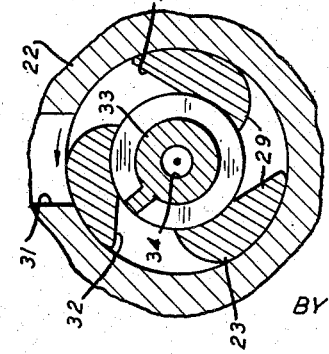
Figure 1:
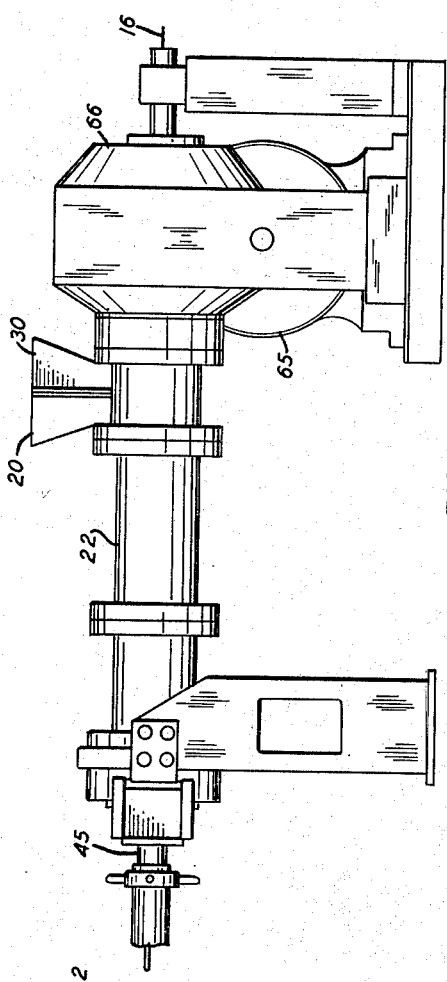
Figure 4:
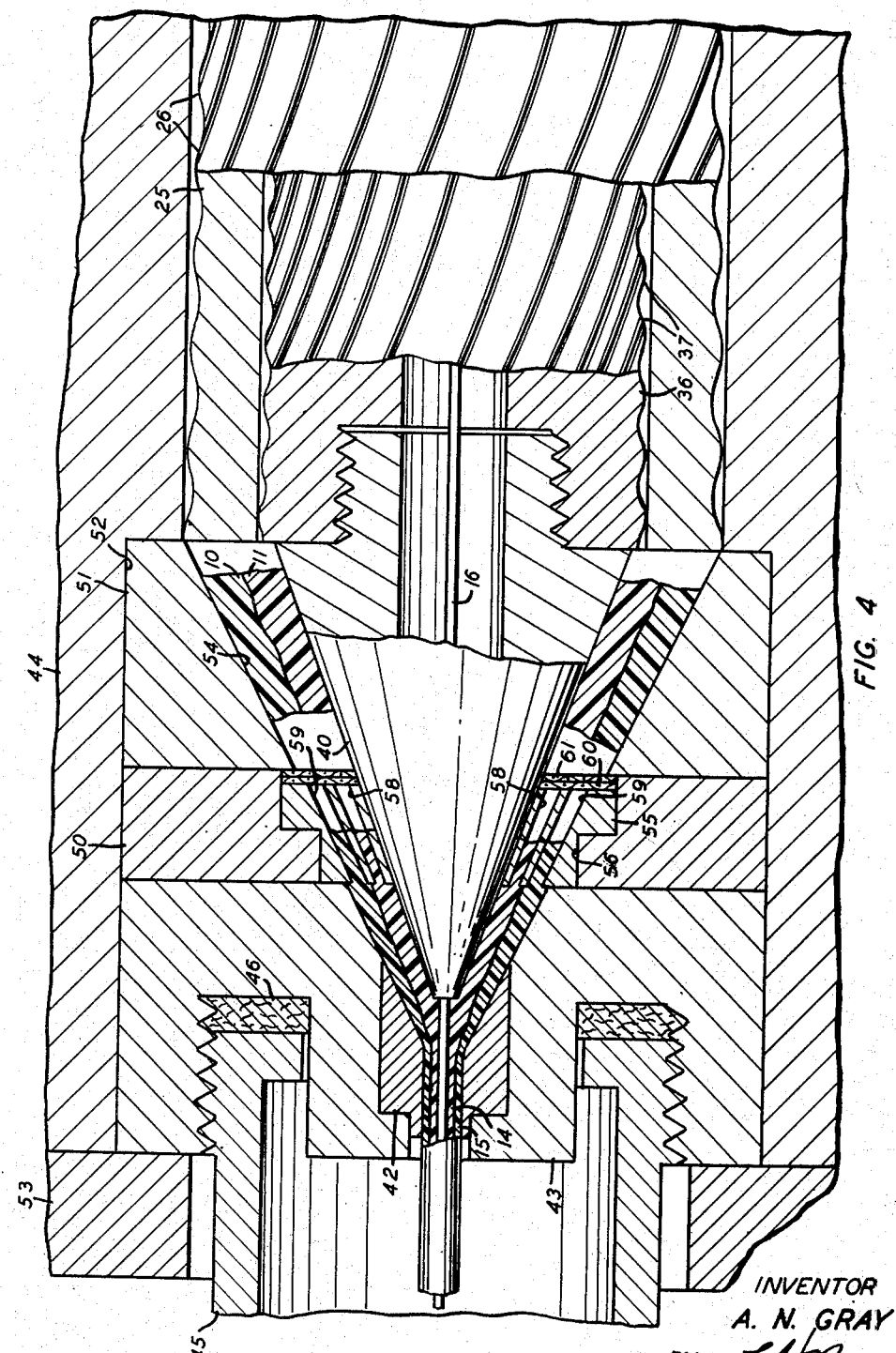
Fig. 4 is an enlarged, fragmentary, vertical section of a portion of the apparatus shown in Fig. 1.

Referring now in detail to the drawings, there is shown in Figs. 1 to 4, inclusive, an extruder for simultaneously working and extruding compounds 10 and 11 into an insulating covering 14 and a jacket 15 on a conductor 16. The jacketing compound 10 is fed into the extruder from a hopper 20 through a feed opening 21 in an extruding cylinder 22 along a tubular stock screw 23 having a thread 24 which varies from deep at the opening 21 to shallow at the delivery end of the screw 23. A tapered, tubular, stock screw extension 25 is fastened rigidly to the stock screw 23, and is provided with a plurality of external, rounded, helical ribs 26—26.

The insulating compound 11 is introduced into the extruder through a hopper 30, from which the compound 11 drops through a feed opening 31 formed in the cylinder 22. The compound 11 passes through the opening 31 and through slots 32—32 (Fig. 3) formed into the interior of the stock screw 23. The slots 32—32 are formed by scoop-shaped blades 29—29 of the screw 23 so as to positively advance the compound 11 inwardly.

A stock screw 33 fits closely within the tubular stock screw 23, and has a heat exchange passage 34 therein. The stock screw 33 also has a thread 35 varying from deep at the entrance end of the screw to shallow at the delivery end thereof. A tapered stock screw extension 36 is fastened to the delivery end of the stock screw 33, and is provided with external, rounded, helical ribs 37—37.

A frustoconical core tube 40 having a passage 41 therethrough is fastened to the end of the extension 36, and serves to guide the conductor 16 through the center of a die 42 mounted in a die holder 43 fastened in an extruding head 44 mounted on the end of the cylinder 22. A vulcanizing tube 45 is fastened to the extruding head 44 and is sealed thereto by a gasket 46. Steam under a high temperature and pressure is introduced to the vulcanizing tube to vulcanize the coverings 14 and 15. The die holder 43, a holder 50 and a guide 51 are held in a socket 52 in the extruding head 44 by a holding plate 53. The guide 51 has a frustoconical passage 54 therein and a breaker plate 55 fits into a stepped socket 56 and is provided with slots 58—58 and 59—59 forming sections of frustrums. The breaker plate supports a coarse backing screen 60, which supports a fine straining screen 61. The guide 51 holds the screens and the breaker plate in the socket 56.

The stock screw 33 is held stationary while the stock screw 23 is rotated in such a direction as to advance to the left, as viewed in Fig. 2, the compound 10 supplied thereto through the opening 21. Power for rotating the stock screw 23 is supplied by means of a motor 65 and suitable gearing enclosed in a housing 66. The thread 35 on the stock screw 33 is in a direction opposite to that of the thread 24 so that the compound 11 introduced to the stock screw 33 is advanced to the left between the stock screws 23 and 33.

Operation of first embodiment (Figs. 1 to 4)

The compounds 10 and 11 are introduced in granular, powdered or pelletized form into the hoppers 20 and 30, respectively, or may be introduced in strip form into the openings 21 and 31 in the cylinder 22. The screw 23 is rotated in a counterclockwise direction, as viewed in Fig. 3, and the screw 33 is held stationary. The screw 23 advances the compound 10 continuously to the left, as viewed in Fig. 2, and compacts and works the compound with progressively increasing intensity to mix it and effect breakdown. The compound 10 is forced along the ribbed extension 25, which severely kneads the compound, and is forced from the extension 25 in tubular form along the guide 51 and through the slots 59—59 and the die 42 which forms it into the smooth-surfaced jacket 15.

Simultaneously, the compound 11 is forced along the interior of the stock screw 23 by the stock screw 33, which mixes and effects breakdown of the compound and forces it along the extension 36. The rounded ribs 37—37 of the extension 36 severely work the compound to bring it to a high state of exrudability. This compound then flows along the core tube 40 in a frustoconical path, and flows through the slots 58—58 in the breaker plate 55 inside the compound 10, which flows through the slots 59—59 in the breaker plate.

The die 42 forms the compounds 10 and 11 into the coverings 14 and 15 concentrically, and the coverings are simultaneously vulcanized under heat and pressure by steam introduced into the vulcanizing tube 45. The stock screw 23 is driven relative to the stock screw 33 in such a direction that the compound 10 is fed to the left, as seen in Fig. 2, by the thread 24 on the stock screw 23, and the compound 11 is fed in the same direction by the thread 35 of the stock screw 33.

The stock screw 33 preferably is held stationary in order to simplify the drive gearing, but it may be driven in a direction opposite to the direction of rotation of the stock screw 23 by suitable gearing provided the direction of the thread 35 is reversed, or may be rotated by suitable differential gearing in the same direction as the stock screw 23, but at a speed substantially lower than that of the stock screw 23. The relative speeds of the two stock screws would be determined by the relative feeds of the compounds 10 and 11 which is sought in order to produce the coverings 14 and 15 of uniform thicknesses and concentricity on the conductor 16.

*Alternate embodiment (Fig. 5)*

This extruder is identical with the extruder shown in Figs. 1 to 4, inclusive, except as indicated hereinbelow. It includes an extruding head 144 having a bore 145 formed therein forming an extension of the bore of the extending cylinder (not shown) to which the extruding head 144 is connected. A tapered, tubular extension 125 mounted rotatably in the bore 145 has ribs 126—126 thereon, and extension 136 mounted in the extension 125 is provided with ribs 137—137. A core tube 140 fastened to the end of the extension 136 is provided with tapered portions 150 and 151 and a tapered tip 152, and also has a cylindrical portion 155 that fits into a bore 156 formed in a breaker plate 157 provided with arcuate slots 160 and 161.

The extruding head 144 is provided with a counterbore 163, and a holding plate 164 presses a die holder 143 against the breaker plate 157 to press a fine straining screen 168 and a backing screen 169 tightly between the breaker plate and the end of the counterbore 163. A die 142 is carried by the die holder 143, and a vulcanizing tube 145 is threadedly secured to the die holder 143 and is sealed thereto by a gasket 146. The extension 125 is provided with a tapered nose portion 128 which extends substantially to the straining screen 168 to deliver a jacketing compound 110 to the slots 161—161 and the extension 136 delivers an insulating compound 111 to the slots 160—160.

*Operation of alternate embodiment (Fig. 5)*

The concentrically mounted stock screws force the compounds 110 and 111 to the left, as viewed in Fig. 5. The compounds 110 and 111 are worked as they are advanced to the delivery ends of the extensions 126 and 136, and the tapered tip 128 of the stock screw extension 125 keeps the compounds separate as they are forced toward the straining screen 168 and the breaker plate 157 so that the compound 110 is forced through the slots 161—161 and the compound 111 is forced through the slots 160—160. The compounds 110 and 111 emerge from the breaker plate in definitely defined concentric layers and are forced along the die holder 143 and the core tube 140 and are formed into coverings 114 and 115 on a conductor 116. The breaker plate 157 acts as a bearing to support the core tube 140 to hold the tip 152 concentrically in the die 142 so that the coverings 114 and 115 are uniform in thickness around the conductor 116.

The above-described apparatus serves to effectively form the two coverings on a conductor simultaneously, which substantially halves the apparatus previously required to apply both a first and a second covering on a conductor, and eliminates all the handling of the conductor normally required to apply the second covering on the first covering. Hence, much floor space, equipment and labor may be saved.

While the invention has been described as applied to the covering of a conductor with coverings of vulcanizable materials, it is obvious that modifications may be made to permit the use of other materials. For example, it may be desirable to cover a conductor with multiple layers of one or more thermoplastic material, such as a polyvinyl compound or polyethylene. In that case, suitable changes may be made in the apparatus without departing from the invention. Thus, the vulcanizing tube would be omitted, and a cooling or tempering means might be supplied near the extruder if thermoplastic materials were employed in apparatus embodying the invention.

Certain features of the above-described apparatus are disclosed and claimed in copending applications Serial No. 86,085, filed April 7, 1949, by G. E. Gliss and Serial No. 86,086, filed April 7, 1949, by A. N. Gray and G. E. Gliss, both of which applications are now abandoned, and in A. N. Gray Patent 2,547,000 granted April 3, 1951.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An extruder, which comprises an extrusion cylinder having a bore extending therealong and also being provided with a feed opening positioned at one point therealong and a second feed opening positioned at a second point along the cylinder positioned farther from the entrance end of the bore than that at which the first-mentioned opening is positioned, an exterior extrusion screw having a thread thereon and provided with a cylindrical passage therethrough, said thread extending along the second-mentioned opening toward the delivery end of the bore, and an interior extrusion screw mounted in the passage in the exterior screw and provided with a thread extending along the portion of the cylinder at which the first-mentioned opening is positioned toward the delivery end of the exterior screw, said exterior screw being provided with a series of slots co-extensive with the first-mentioned opening in the extruding cylinder to permit the compound to be introduced through said first-mentioned opening and the openings in the exterior screw to the interior screw, said exterior screw being rotatable in a direction such as to advance compound introduced to both the screws along the screws, said interior screw being fixed relative to the extruding cylinder.

2. A concentric extruder, which comprises an extruding cylinder having an extruding bore extending therealong, an opening positioned at the entrance end of the bore and a second opening positioned between the first-mentioned opening and the delivery end of the bore near the entrance of the bore, an exterior extruding screw provided with a cylindrical passage extending therealong and also having a plurality of slots coextensive with the first-mentioned opening in the extruding cylinder and a thread extending in a predetermined direction from the second-mentioned opening in the extruding cylinder toward the delivery end of the bore, an interior stock screw having a passage extending therethrough mounted in the exterior stock screw and provided with a thread extending therearound in a direction opposite to that of the thread of the exterior screw from the slots in the exterior screw toward the delivery ends of the screws, a core tube mounted on the delivery end of the interior screw, a die mounted concentrically with the core tube, said exterior screw being rotatable relative to the interior screw and the extruding cylinder in such a direction as to advance compounds along both the screws.

3. A concentric extruder, which comprises an extruding cylinder having an extruding bore extending therealong, an opening positioned at the entrance end of the bore and a second opening positioned between the first-mentioned opening and the delivery end of the bore near the entrance of the bore, an exterior extruding screw provided with a cylindrical passage extending therealong and also having a plurality of slots coextensive with the first-mentioned opening in the extruding cylinder and a thread extending in a predetermined direction from the second-mentioned opening in the extruding cylinder toward the delivery end of the bore, an interior stock screw having a passage extending therethrough mounted in the exterior stock screw and provided with a thread extending therearound in a direction opposite to that of the thread of the exterior screw from the slots in the exterior screw toward the delivery end of the screws, a core tube mounted on the delivery end of the interior screw, a die mounted concentrically with the core tube, a breaker plate provided with outer slots to permit passage of compound from the exterior screw and inner slots to permit passage of compound from the interior screw positioned at the delivery ends of the screws, said exterior screw being rotated relative to the interior screw and the extruding cylinder in such a direction as to advance compounds along both the screws.

4. A concentric extruder, which comprises an extruding cylinder having an extruding bore extending therealong, an opening positioned at the entrance end of the bore and a second opening positioned between the first-mentioned opening and the delivery end of the bore near the entrance of the bore, an exterior extruding screw provided with a cylindrical passage extending therealong and also having a plurality of slots coextensive with the first-mentioned opening in the extruding cylinder and a thread extending in a predetermined direction from the second-mentioned opening in the extruding cylinder toward the delivery end of the bore, an interior stock screw having a passage extending therethrough mounted in the exterior stock screw and provided with a thread extending therearound in a direction opposite to that of the thread of the exterior screw toward the delivery end of the screws, a core tube mounted on the delivery end of the interior screw and provided with a cylindrical portion, a die mounted concentrically with the core tube at the delivery end thereof, a breaker plate provided with a socket for receiving the cylindrical portion of the core tube, said exterior screw being rotated relative to the interior screw and the extruding cylinder in such a direction as to advance compounds along both the screws.

5. An apparatus for advancing and working elastomer compounds, which comprises an extruding cylinder having a bore therein and feed openings spaced along the portion thereof near the entrance end of the bore, a tubular stock screw mounted rotatably in the bore and provided with a thread extending in a predetermined direction therearound, said screw also being provided with feed apertures extending from the exterior to the interior thereof at the feed opening more adjacent to the entrance end of the bore, a second stock screw extending along the interior of the tubular stock screw and provided with a thread thereon extending in the opposite direction therearound, and means for effecting relative rotating between the tubular stock screw and the second stock screw so as to advance elastomer compounds along the screws in the same direction.

6. An extruder, which comprises an extruding cylinder having a pair of feed openings spaced therealong, a hollow stock screw mounted rotatably in the cylinder and provided with a thread extending along one of the openings and blades forming inclined slots extending through the stock screw along the other opening, and a second stock screw mounted in the first-mentioned screw and provided with a thread extending along the slots in the first-mentioned screw.

7. A concentric extruder, which comprises an extruding cylinder having a pair of feed openings spaced therealong, a hollow stock screw extending along the interior of the cylinder, said stock screw being provided with a plurality of scoops substantially co-extensive with the opening nearest the entrance end of the cylinder and also being provided with a thread extending along the other opening, means for rotating the stock screw in such a direction that the scoops force compound from the opening adjacent thereto into the interior of the screw, and a second screw mounted in the first-mentioned screw for forcing compound along the interior of the first-mentioned screw scooped into the interior of the first-mentioned screw.

References Cited in the file of this patent

UNITED STATES PATENTS

| Number | Name | Date |
|---|---|---|
| 484,777 | Chase | Oct. 25, 1892 |
| 817,080 | Mahoney | Apr. 3, 1906 |
| 1,294,008 | Will | Feb. 11, 1919 |
| 1,516,841 | Buttfield | Nov. 25, 1924 |
| 1,553,362 | Calcutt | Sept. 15, 1925 |
| 1,802,605 | Kemp | Apr. 28, 1931 |
| 1,978,163 | Megow | Oct. 23, 1934 |
| 2,469,999 | Stober | May 10, 1949 |
| 2,553,076 | Bradley | May 15, 1951 |